Patented Oct. 27, 1936

2,058,987

UNITED STATES PATENT OFFICE 2,058,987

CEMENTITIOUS MATERIAL

Dean S. Hubbell, Pittsburgh, Pa., assignor to H. H. Robertson Company, Pittsburgh, Pa., a corporation of Pennsylvania No Drawing. Application February 13, 1936, Serial No. 63,736

7 Claims. (Cl. 106—29)

This invention relates to a cement, and particularly to a cement of the sorrel type.

One object of the invention is to provide a novel and improved cement of the sorrel type which may be economically manufactured, which possesses superior water resistance, and which is adapted for a large number of industrial and commercial uses.

A further and more specific object of the invention is to provide a novel and improved oxychloride cement which is characterized by its superior water resistance and increased strength as compared to prior forms of oxychloride cements now upon the market.

With these general objects in view and such others as may hereinafter appear, the invention consists in the cementitious materials, and particularly in the oxychloride cement hereinafter described and particularly defined in the claims at the end of this specification.

As is generally known, magnesia cements have been heretofore disqualified from many industrial and commercial uses because of the extent to which their cementing constituent dissolves in water forming a dilute solution of magnesium chloride. It has been found that if this magnesium chloride is not removed as rapidly as it forms, it accelerates the disintegration of the cement due to the even greater solubility of magnesium chloride in it than in water.

I have discovered that a very superior cement may be produced by incorporating in a sorrel cement and particularly in a magnesium oxychloride cement, a relatively small proportion of finely divided cuprous oxide. In general the amount of cuprous oxide will preferably be substantially less than the amount of cement in any given cementitious material, and in practice I have experienced satisfactory results using an amount of cuprous oxide varying from 3 to 10%, although it is understood that these proportions are indicative only of the average oxychloride cement, and for special purposes the proportions may be varied as may be readily determined by experiment.

After a cement embodying the invention and produced as above described has become hardened, and also during the hardening process, a bluish-green characteristic color is imparted thereto which I regard is due to the reaction between the cuprous oxide and the excess magnesium chloride in the presence of air, producing an insoluble copper compound, probably a basic copper chloride which is disposed in the voids between the particles of the cement aggregate, and as a result the improved cement, and particularly magnesium oxychloride cement has been found to experience none of the undesirable characteristics which have characterized prior cements of this type. I attribute the desirable characteristics and properties of my improved cement to the fact that the cuprous oxide undoubtedly removes the excess magnesium chloride remaining in the cement after the formation of the magnesium oxychloride and upon corrosion swells up to fill the voids in the aggregate thereby producing an improved cement possessing increased water resistance and increased strength. The increased strength and water resistance of the improved cement is particularly advantageous when the cements are to be used under conditions in which they are subjected to water.

While cuprous oxide in various degrees of purity may be used with varying degrees of success, it is preferred to utilize a cuprous oxide that is substantially free from cupric oxide and extremely satisfactory results have been obtained using such material. Cuprous oxide possesses an inherent characteristic which renders its use of advantage in the production of the present cement in that it is brittle and can be ground to an extremely fine powder and in such a condition when incorporated in the cement has been found to give most satisfactory results. It is therefore preferred to utilize the cuprous oxide in as finely a ground condition as practicable.

While the preferred cementitious materials have been herein described, it will be understood that the invention may be embodied in other compositions within the scope of following claims.

Having thus described the invention, what is claimed is:

1. A cementitious material possessing improved weather resistance comprising a cement of the sorrel type containing finely divided cuprous oxide in an amount substantially less than the amount of the cement.

2. A cementitious material possessing improved weather resistance comprising a magnesium oxychloride cement containing finely divided cuprous oxide in an amount substantially less than the amount of the cement.

3. A cementitious material possessing improved weather resistance comprising a major proportion of a cement of the sorrel type containing an aggregate forming voids between the particles thereof and a minor proportion of finely divided cuprous oxide, a bluish-green insoluble copper compound being disposed in said voids.

4. A cementitious material possessing improved weather resistance comprising a major proportion of a magnesium oxychloride cement containing an aggregate forming voids between the particles thereof and a minor proportion of finely divided cuprous oxide, a bluish-green insoluble copper compound being disposed in said voids.

5. A cementitious material possessing improved weather resistance comprising a cement of the sorrel type containing finely divided cuprous oxide in an amount substantially less than the amount of the cement and substantially free from cupric oxide.

6. A cementitious material possessing improved weather resistance comprising a magnesium oxychloride cement containing finely divided cuprous oxide in an amount substantially less than the amount of the cement and substantially free from cupric oxide.

7. A cementitious material possessing improved weather resistance comprising a magnesium oxychloride cement containing finely divided cuprous oxide.

DEAN S. HUBBELL.